United States Patent
Bauman et al.

(10) Patent No.: US 12,025,487 B2
(45) Date of Patent: Jul. 2, 2024

(54) DISTRIBUTED ACOUSTIC SENSING SYSTEM WITH PROPAGATION DIRECTION AND RELATED METHODS

(71) Applicant: Eagle Technology, LLC, Melbourne, FL (US)

(72) Inventors: Stephen J. Bauman, Palm Bay, FL (US); Christin Lundgren, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 40 days.

(21) Appl. No.: 17/655,608

(22) Filed: Mar. 21, 2022

(65) Prior Publication Data

US 2023/0296425 A1   Sep. 21, 2023

(51) Int. Cl.
*G01H 9/00* (2006.01)
*G01V 8/22* (2006.01)
*G01V 8/24* (2006.01)

(52) U.S. Cl.
CPC .............. *G01H 9/004* (2013.01); *G01V 8/22* (2013.01); *G01V 8/24* (2013.01)

(58) Field of Classification Search
CPC . G01H 9/004; G01V 8/16; G01V 8/22; G01V 8/24
See application file for complete search history.

(56) References Cited

U.S. PATENT DOCUMENTS

| 5,373,487 | A | 12/1994 | Crawford et al. |
| 9,140,815 | B2 | 9/2015 | Lopez et al. |
| 9,561,812 | B2 | 2/2017 | Godfrey |
| 10,837,806 | B2 | 11/2020 | Handerek |
| 2014/0208855 | A1 | 7/2014 | Skinner |
| 2020/0225079 | A1* | 7/2020 | Cedilnik ............ G01M 11/3109 |
| 2022/0137595 | A1* | 5/2022 | Xia .......................... H04Q 9/00 700/28 |
| 2022/0163376 | A1* | 5/2022 | Xia ..................... G01D 5/35361 |
| 2023/0095884 | A1* | 3/2023 | Ellmauthaler .......... E21B 47/06 367/35 |

(Continued)

FOREIGN PATENT DOCUMENTS

| CN | 106908220 A | * | 6/2017 | ............. G01D 5/268 |
| CN | 107884060 A | * | 4/2018 | ............. G01H 9/004 |

(Continued)

OTHER PUBLICATIONS

Cheng et al. "Utilizing Distributed Acoustic Sensing and Ocean Bottom FiberOptic Cables for Submarine Structural Characterization" https://eartharxiv.org/repository/view/1812/ Abstract Only Retreived From Internet Mar. 3, 2022.

*Primary Examiner* — Michelle R Connelly
*Assistant Examiner* — Mary A El-Shammaa
(74) *Attorney, Agent, or Firm* — ALLEN, DYER, DOPPELT + GILCHRIST, P.A.

(57) ABSTRACT

A DAS system may include an OTDR, and acoustic-sensing optical fibers coupled to the OTDR. The acoustic-sensing optical fibers may have known relative positions within an acoustic wave transmitting medium. The DAS system may also include a processor cooperating with the OTDR to determine a propagation direction of an acoustic wave from an acoustic event in the acoustic wave transmitting medium based upon the known relative positions of the acoustic-sensing optical fibers.

11 Claims, 7 Drawing Sheets

(56) References Cited

U.S. PATENT DOCUMENTS

2023/0184597 A1\* 6/2023 LeBlanc ................. G01L 1/246
374/161

FOREIGN PATENT DOCUMENTS

| CN | 115166638 A | \* | 10/2022 | | |
|---|---|---|---|---|---|
| WO | WO-2017009606 A1 | \* | 1/2017 | ............. | G01D 5/268 |
| WO | WO-2019014721 A1 | \* | 1/2019 | ............. | G01H 9/004 |
| WO | WO-2021153142 A1 | \* | 8/2021 | ............. | G01D 5/268 |

\* cited by examiner

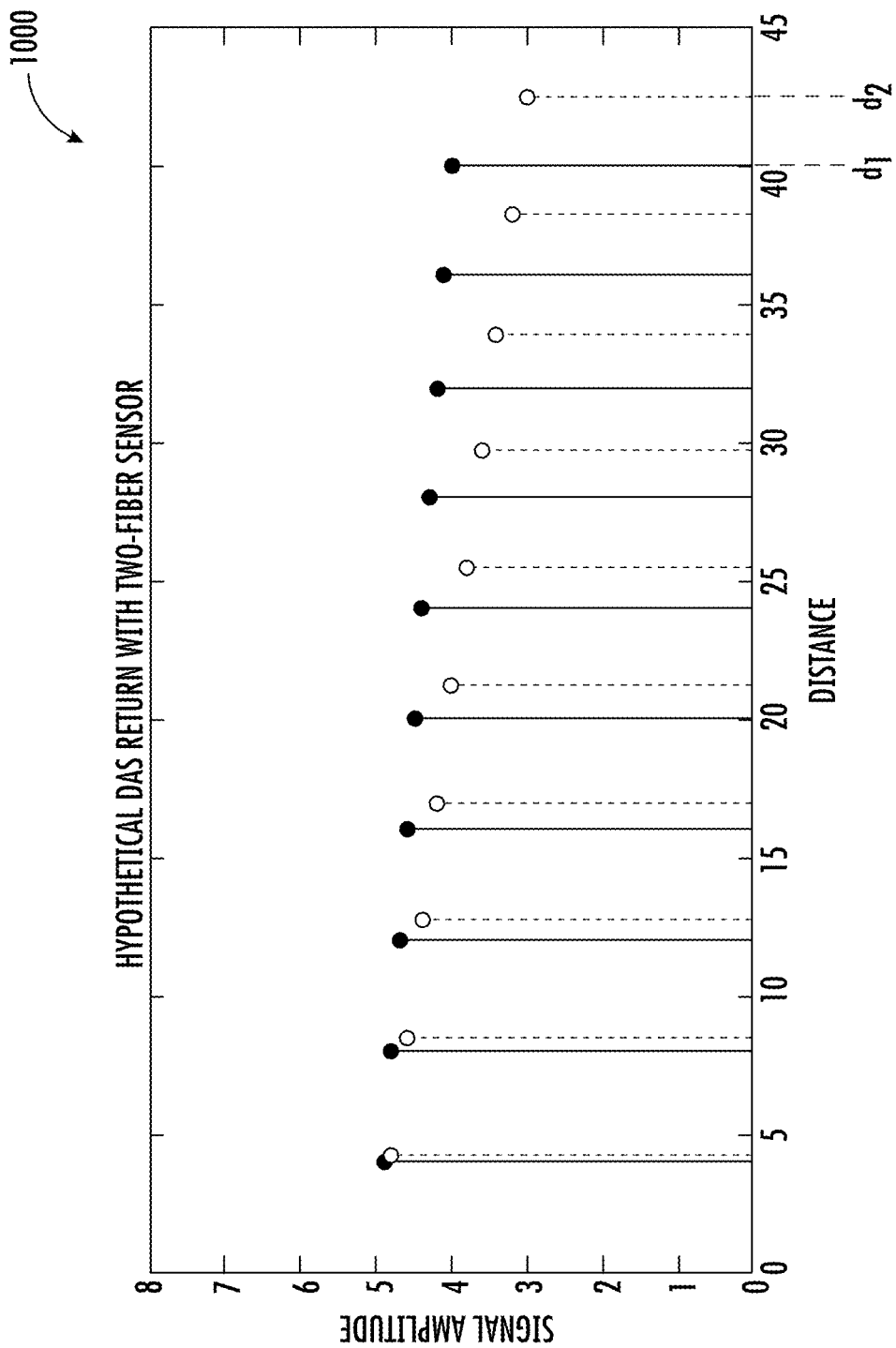

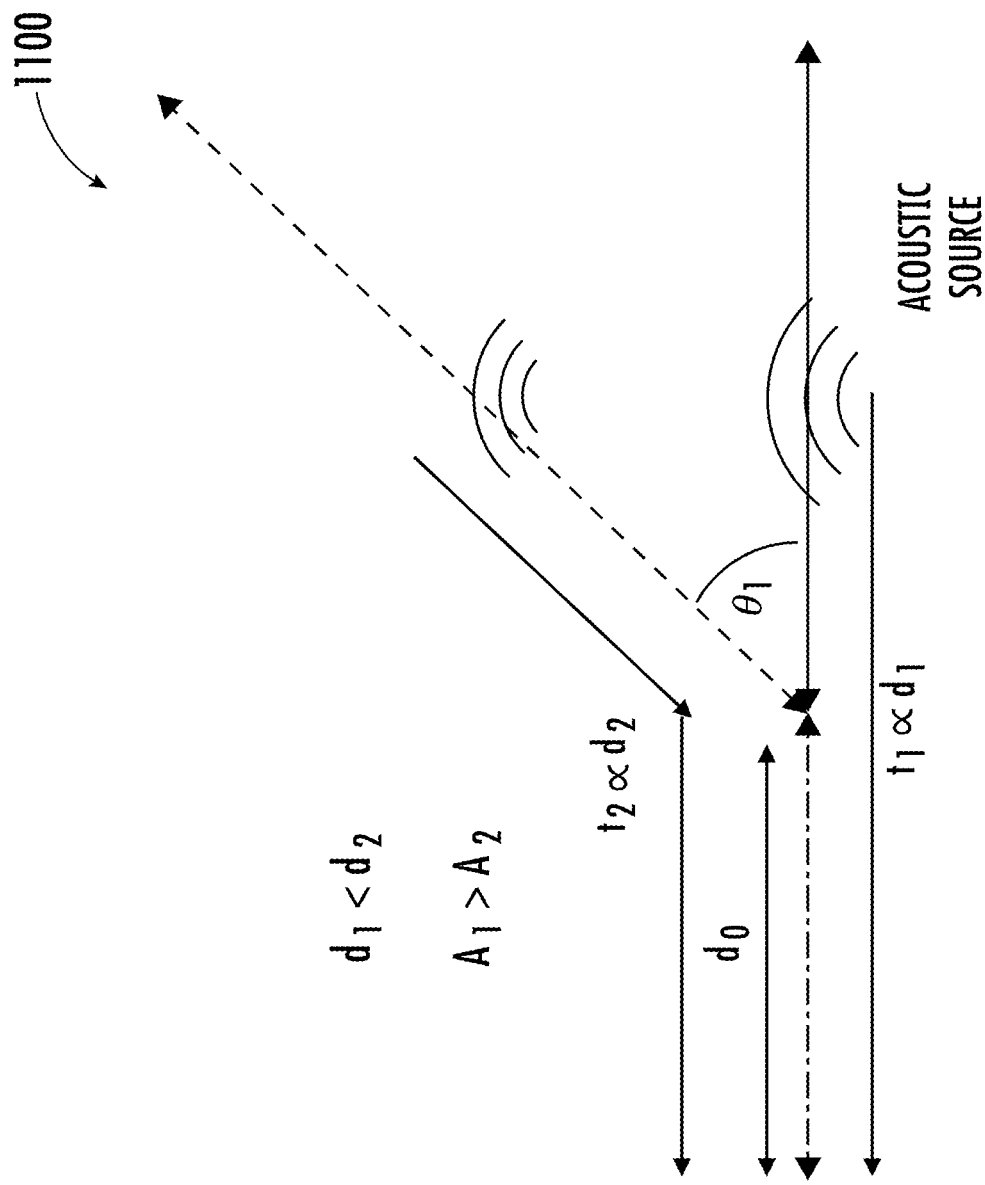

DISTRIBUTED ACOUSTIC SENSING SYSTEM WITH PROPAGATION DIRECTION AND RELATED METHODS

TECHNICAL FIELD

The present disclosure relates to the field of acoustic signal sensing, and, more particularly, to a distributed acoustic sensing system and related methods.

BACKGROUND

Remote sensing applications have a wide range of applications. One particular type of sensing is acoustic signal sensing. Broadly, acoustic signals are mechanical waves in gases, liquids, and solids. For example, in security, a person trespassing on private property creates acoustic waves that propagate through the ground. Similarly, seismic events, such as earthquakes, create powerful acoustic waves in the ground that can be detected at far distances from the source.

In underground applications, acoustic sensing devices are placed underground to monitor infrastructure. For example, buried pipelines can be monitored for signs of compromised structure, such as cracks that can cause leaks. In some applications, above ground pipelines that span many miles can be monitored remotely. Similarly, transportation infrastructure, such as bridges, can be monitored for structural fatigue to prevent catastrophic failure.

On advantageous type of remote acoustic sensing is distributed acoustic sensing (DAS). In this approach, optical fibers are positioned in the area or structure to be monitored, and this approach is based upon, for example, Rayleigh backscattering. Here, a coherent laser pulse is sent along an optical fiber, and scattering sites within the optical fiber cause the optical fiber to act as a distributed interferometer. The intensity of the reflected light is measured as a function of time after transmission of the laser pulse. This is known as optical time domain reflectometry. When an acoustic signal is received, the reflected optical signals change based upon the received acoustic signal.

SUMMARY

Generally, a DAS system may include an optical time domain reflectometer (OTDR), and a plurality of acoustic-sensing optical fibers coupled to the OTDR. The plurality of acoustic-sensing optical fibers may have known relative positions within an acoustic wave transmitting medium, for example, ground. The DAS system may also include a processor cooperating with the OTDR to determine a propagation direction of an acoustic wave from an acoustic event in the acoustic wave transmitting medium based upon the known relative positions of the plurality of acoustic-sensing optical fibers.

More specifically, the DAS system may comprise an optical coupler between the OTDR and the plurality of acoustic-sensing optical fibers. In some embodiments, the optical coupler may comprise an optical switch. The processor may be configured to detect the acoustic event via a given acoustic-sensing optical fiber, and cause the optical switch to switch from the given acoustic-sensing optical fiber to another acoustic-sensing optical fiber. The processor may be configured to operate the optical switch to sequentially couple the OTDR to the plurality of acoustic-sensing optical fibers. In other embodiments, the optical coupler may comprise a fixed optical coupler.

Also, the OTDR may comprise an optical source configured to inject a sensing optical signal into a coupled acoustic-sensing optical fiber, and an optical detector configured to receive a return optical signal from the coupled acoustic-sensing optical fiber. The plurality of acoustic-sensing optical fibers may be arranged in a diverging pattern. For example, each of the plurality of acoustic-sensing optical fibers may have a length greater than 10 km.

Another aspect is directed to a DAS device comprising an OTDR to be coupled to a plurality of acoustic-sensing optical fibers having known relative positions within an acoustic wave transmitting medium, and a processor. The processor may be configured to determine a propagation direction of an acoustic wave from an acoustic event in the acoustic wave transmitting medium based upon the known relative positions of the plurality of acoustic-sensing optical fibers.

Yet another aspect is directed to a method of DAS using a plurality of acoustic-sensing optical fibers having known relative positions within an acoustic wave transmitting medium. The method may include operating an OTDR in cooperation with a processor to determine a propagation direction of an acoustic wave from an acoustic event in the acoustic wave transmitting medium based upon the known relative positions of the plurality of acoustic-sensing optical fibers.

BRIEF DESCRIPTION OF THE DRAWINGS

FIG. 2 is a diagram of amplitude values for return optical signals in the DAS system of FIG. 1.

FIGS. 3A & 3B are diagrams of determining a propagation direction of an acoustic wave from an acoustic event in the DAS system of FIG. 1.

DETAILED DESCRIPTION

Figure 1:
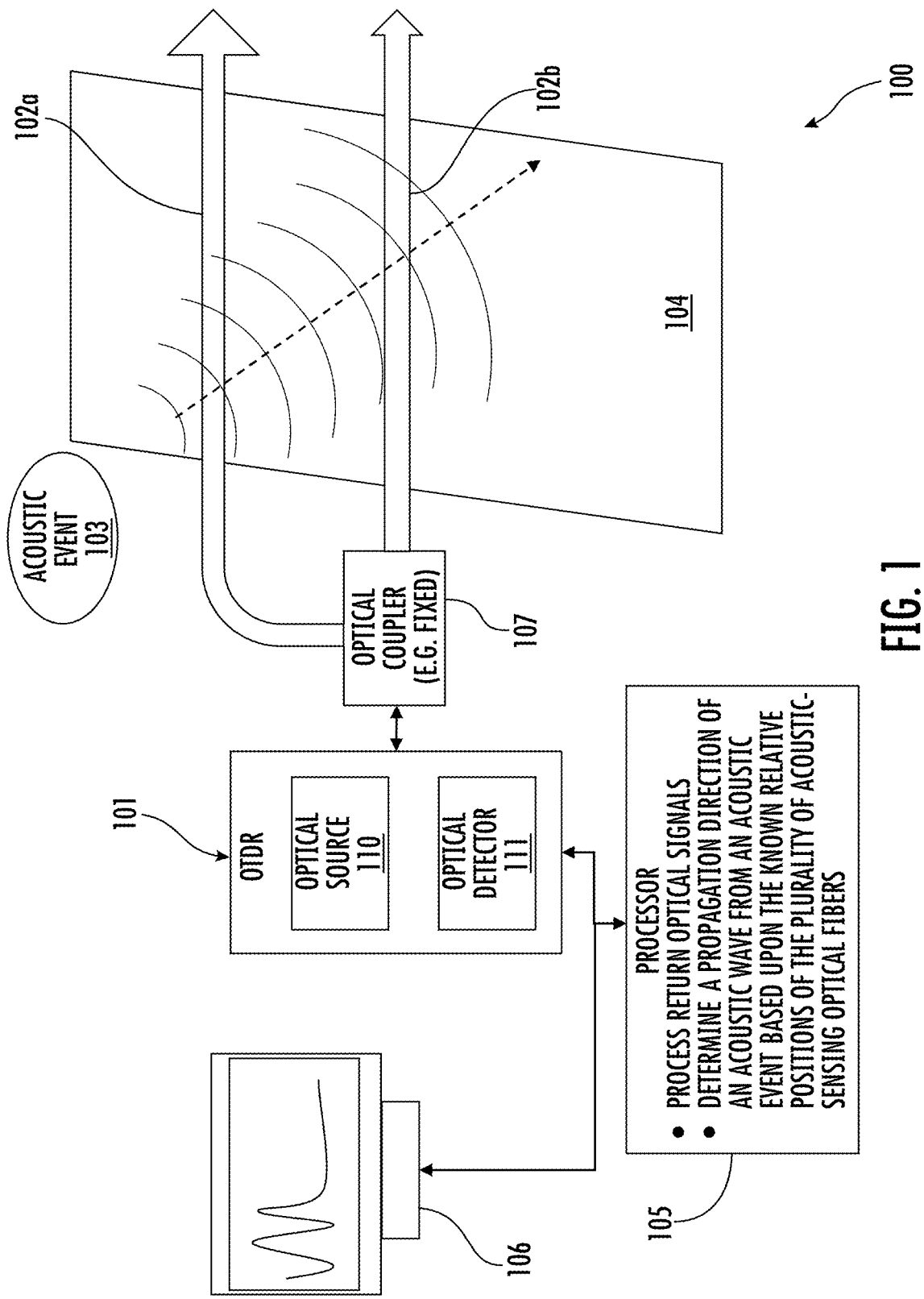
FIG. 1 is a schematic diagram of a DAS system of a first embodiment, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Typical DAS systems may have drawbacks. For instance, typical single-fiber DAS methods may not resolve all ambiguities associated with the direction of travel of an acoustic wave. Indeed, in some approaches, the location of impact of the acoustic wave is the only datum generated.

Referring initially to FIG. 1, a DAS system 100 according to the present disclosure is now described. The DAS system 100 may provide an approach to the drawbacks of typical DAS systems. The DAS system 100 illustratively includes an OTDR 101, and a plurality of acoustic-sensing optical fibers 102a-102b coupled to the OTDR. As will be appreciated and for illustrative clarity, the plurality of acoustic-sensing optical fibers 102a-102b comprises only two optical fibers, but the DAS system 100 may include a greater number of optical fibers. The plurality of acoustic-sensing optical fibers 102a-102b is positioned to monitor an area of interest for an acoustic event 103. For example, the area of interest may comprise a geographic region, an underground region, underground infrastructure (e.g. well), or aboveground infrastructure (e.g. pipeline, bridges). The area of interest comprises an acoustic wave transmitting medium 104. Depending on the application, the acoustic wave transmitting medium 104 may comprise ground, air, or water, for example.

The plurality of acoustic-sensing optical fibers 102a-102b has known relative positions within the acoustic wave transmitting medium 104. In particular, the plurality of acoustic-sensing optical fibers 102a-102b is arranged in a diverging pattern, and the spatial spacing therebetween is known throughout the length of the plurality of acoustic-sensing optical fibers. Also, the angle $\theta_1$ of the diverging pattern of the plurality of acoustic-sensing optical fibers 102a-102b is known. In some applications, such as where the area of interest is a large geographic region, each of the plurality of acoustic-sensing optical fibers 102a-102b may have a length greater than 10 km, for example.

The DAS system 100 illustratively includes a processor 105 cooperating with the OTDR 101, and a display 106 coupled to the processor. Also, the DAS system 100 comprises an optical coupler 107 between the OTDR 101 and the plurality of acoustic-sensing optical fibers 102a-102b.

Further, the OTDR 101 comprises an optical source 110 configured to inject a sensing optical signal into the plurality of acoustic-sensing optical fibers 102a-102b, and an optical detector 111 configured to receive return optical signals from the plurality of acoustic-sensing optical fibers. In some embodiments, the display 106 is configured to provide a distance graph of the return signals, a time domain signal graph of the return signals, and a power spectrum graph of the return signals.

In some embodiments, the optical source 110 comprises an optical laser source operating within a wavelength range of 1300-1550 nm. More specifically, the sensing optical signal may comprise an optical pulse train with a pulse frequency in the range of 80-120 kHz. Also, as will be appreciated, the return optical signals from the plurality of acoustic-sensing optical fibers 102a-102b comprise backscatter signals (e.g. Rayleigh backscatter signals, interface/break backscatter signals, or Brillouin backscatter signals).

In some OTDR embodiments, the returns from multiple pulses are averaged together to look at the static fiber locations having high loss to indicate breaks, bends, connections, etc. As will be appreciated, the OTDR 101 may comprise a phase-sensitive OTDR in some embodiments. Here, the DAS system 100 is configured to process transient signals, and uses the return from each pulse of light sent into the plurality of acoustic-sensing optical fibers 102a-102b and analyzes the phase content of the return from each point along the acoustic-sensing optical fiber to provide its real-time acoustic sensing capability.

In the illustrated embodiment, the optical coupler 107 comprises a fixed optical coupler. For example, the fixed optical coupler comprises a Y-branched optical fiber, or an optical splitter. The processor 105 is configured to process return optical signals from the plurality of acoustic-sensing optical fibers 102a-102b concurrently.

Figure 3B:
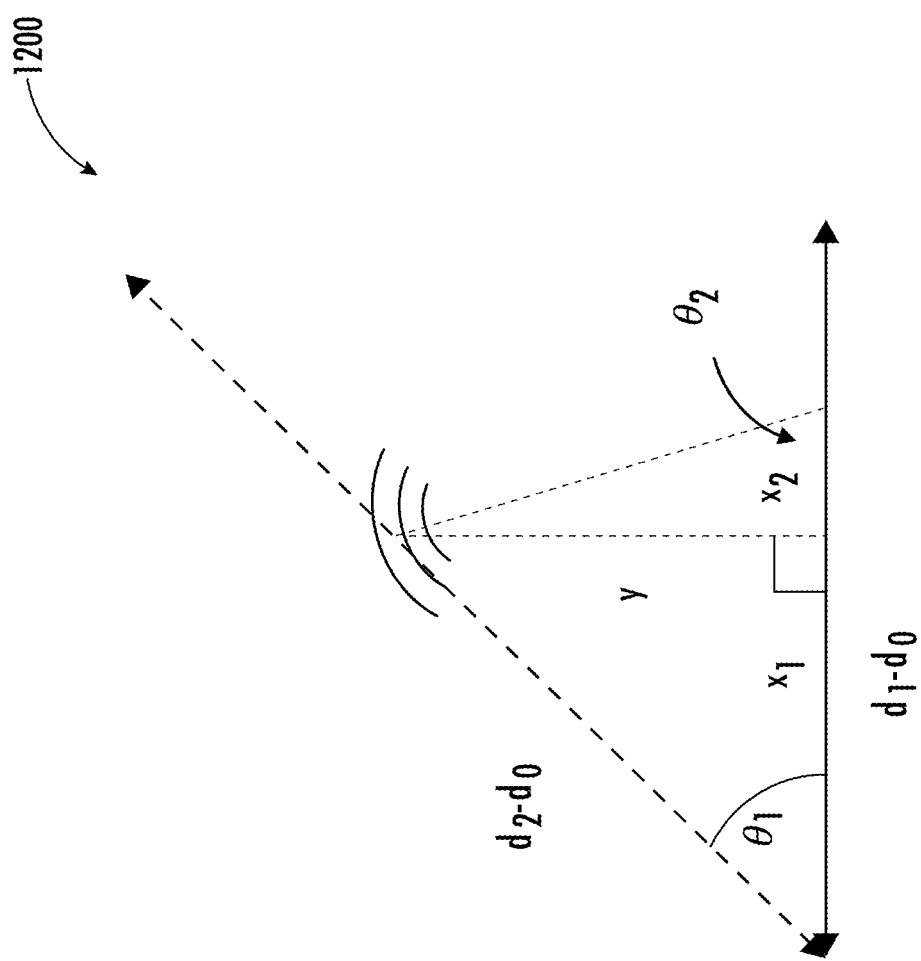

Referring now additionally to FIGS. 2 & 3A-3B, the processor 105 is configured to determine a propagation direction $\theta_2$ of an acoustic wave from the acoustic event 103 in the acoustic wave transmitting medium 104 based upon the known relative positions of the plurality of acoustic-sensing optical fibers 102-102b. In diagram 1000, the amplitude values of the return optical signals over distance are shown. In diagrams 1100 & 1200, the calculations for the propagation direction $\theta_2$ of the acoustic wave from the acoustic event 103 are illustrated. Using the known angle $\theta_1$ of the diverging pattern of the plurality of acoustic-sensing optical fibers 102a-102b and the known spatial spacing between the plurality of acoustic-sensing optical fibers, the processor 105 is configured to generate the propagation direction $\theta_2$ of the acoustic wave from the acoustic event 103 in the acoustic wave transmitting medium 104.

Beginning with the known angle $\theta_1$ of the diverging pattern of the plurality of acoustic-sensing optical fibers 102a-102b, Formula 1 provides:

$$\sin\theta_1 = \frac{y}{d_2 - d_0} \qquad (1)$$

The values for y, $x_1$, and $x_2$ are provided by Formulas 2, 3, and 4, respectively, which are $$y = (d_2 - d_0)\sin\theta_1 \qquad (2)$$

$$x_1 = (d_2 - d_0)\cos\theta_1 \qquad (3)$$

$$x_2 = (d_1 - d_0) - x_1 \qquad (4)$$

With these values, Formula 5 provides the propagation direction $\theta_2$ of the acoustic wave from the acoustic event 103 in the acoustic wave transmitting medium 104.

$$\theta_2 = \tan^{-1}\frac{y}{x_2} \qquad (5)$$

Where $t_1$ and $t_2$ provide velocity of wave travel.

Another aspect is directed to a DAS device comprising an OTDR 101 to be coupled to a plurality of acoustic-sensing optical fibers 102a-102b having known relative positions within an acoustic wave transmitting medium 104, and a processor 105. The processor 105 is configured to determine a propagation direction $\theta_2$ of an acoustic wave from an acoustic event 103 in the acoustic wave transmitting medium 104 based upon the known relative positions of the plurality of acoustic-sensing optical fibers 102a-102b.

Yet another aspect is directed to a method of operating a DAS device. The DAS device comprises an OTDR 101 to be coupled to a plurality of acoustic-sensing optical fibers 102a-102b having known relative positions within an acoustic wave transmitting medium 104. The method includes determining a propagation direction $\theta_2$ of an acoustic wave from an acoustic event 103 in the acoustic wave transmitting medium 104 based upon the known relative positions of the plurality of acoustic-sensing optical fibers 102a-102b.

Yet another aspect is directed to a method of DAS using a plurality of acoustic-sensing optical fibers 102a-102b having known relative positions within an acoustic wave transmitting medium 104. The method includes operating an OTDR 101 in cooperation with a processor 105 to determine a propagation direction of an acoustic wave from an acoustic event 103 in the acoustic wave transmitting medium 104 based upon the known relative positions of the plurality of acoustic-sensing optical fibers 102a-102b.

Figure 4:
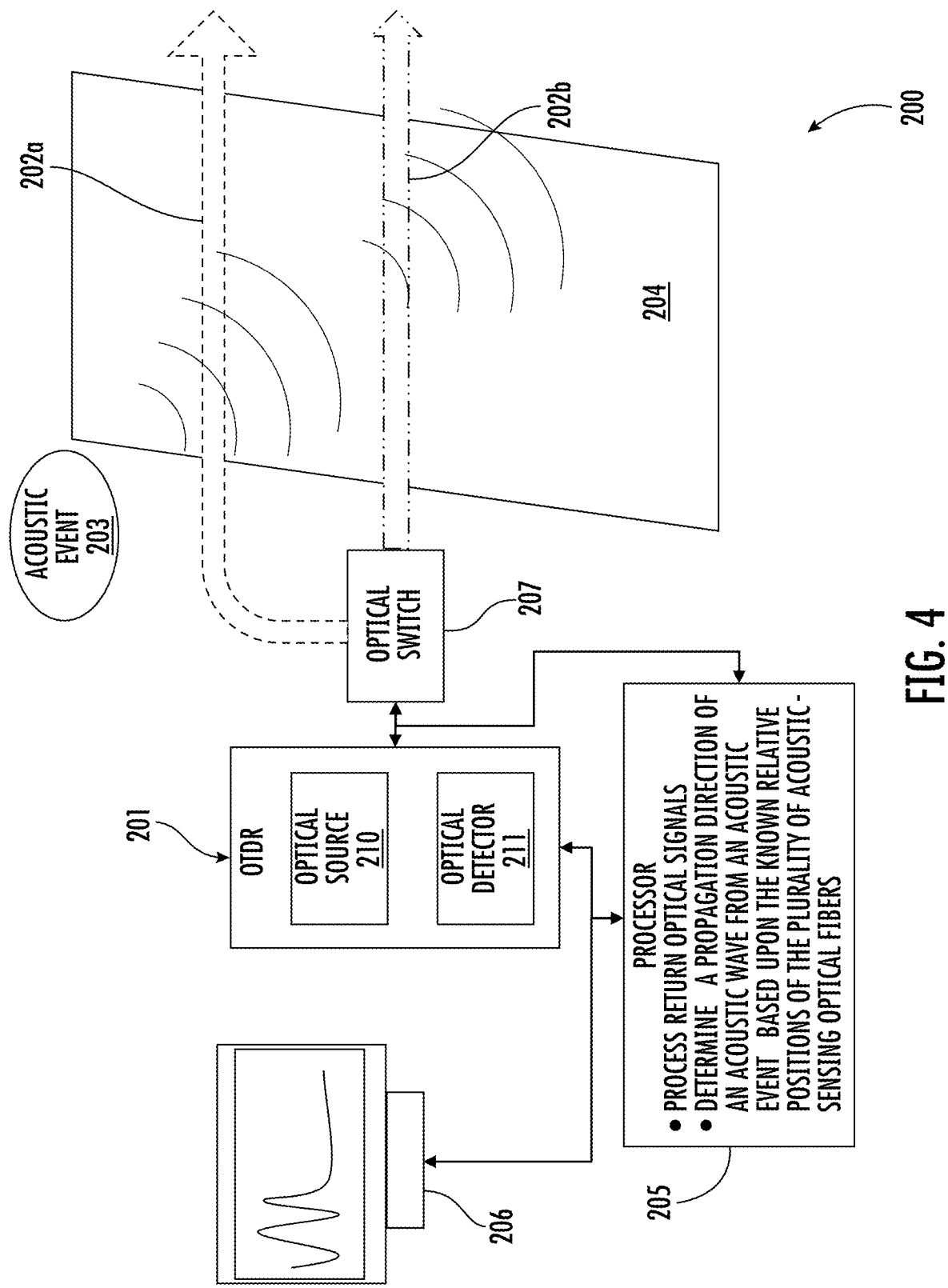
FIG. 4 is a schematic diagram of a DAS system of a second embodiment, according to the present disclosure.
Figure 5:
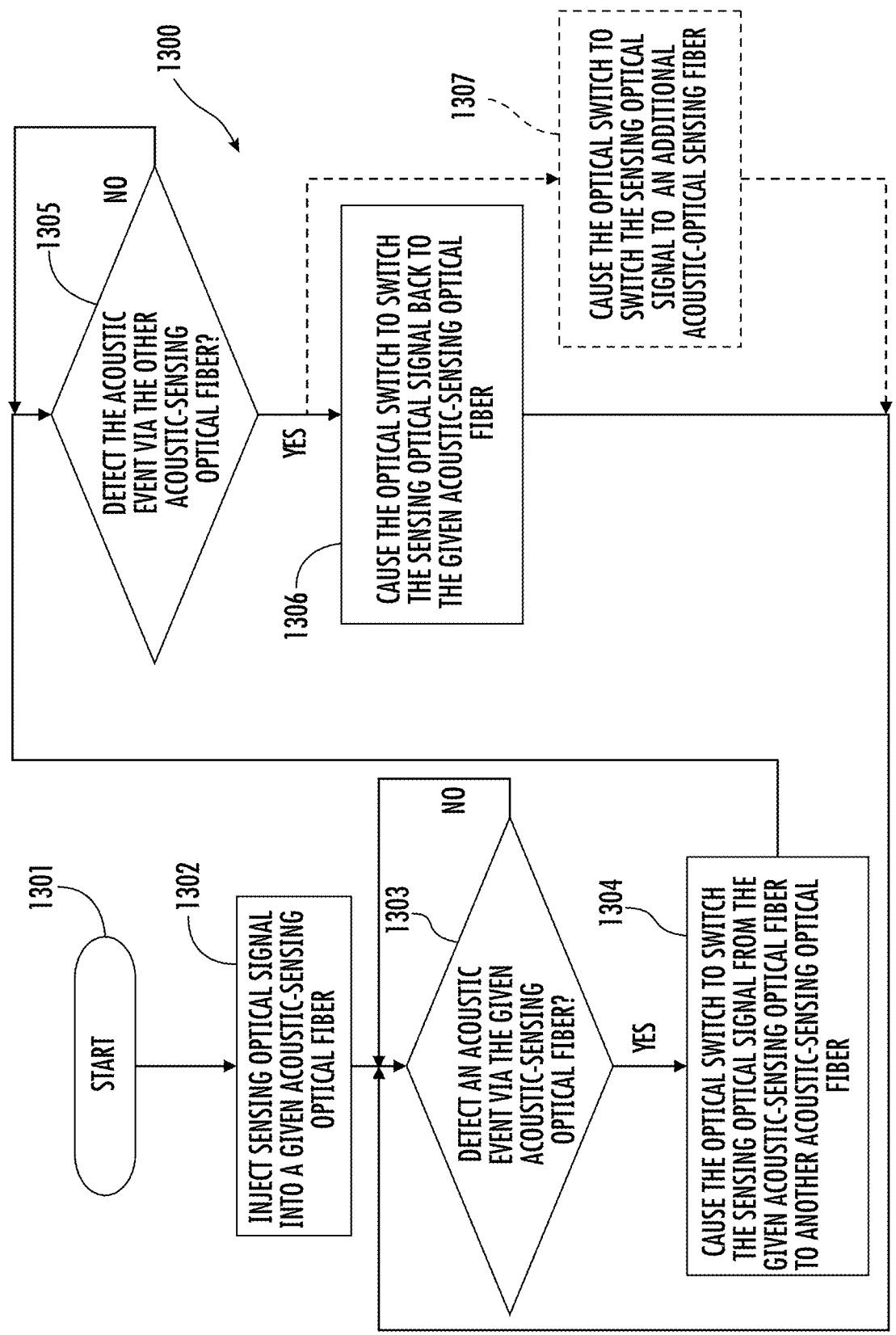
FIG. 5 is a flowchart of a method for operating the DAS system of FIG. 4.

Referring now additionally to FIGS. 4-5, another embodiment of the DAS system 200 is now described with reference to a flowchart 1300, which begins at Block 1301. In this embodiment of the DAS system 200, those elements already discussed above with respect to FIGS. 1-3B are incremented by 100 and most require no further discussion herein. This embodiment differs from the previous embodiment in that this DAS system 200 illustratively includes the optical coupler comprising an optical switch 207. The optical switch 207 may comprise a bidirectional optical switch, thereby allowing signal propagation without significant disruption of phase, etc. The optical switch 207 is fast enough to make a stable transition between the plurality of acoustic-sensing optical fibers 202a-202b in the time that it would take the acoustic wave to travel from a given first acoustic-sensing optical fiber 202a to a second acoustic-sensing optical fiber 202b.

Illustrated with dashed lines, the processor 205 is be configured to detect the acoustic event 203 via the given first acoustic-sensing optical fiber 202a (Blocks 1302-1303), and cause the optical switch 207 to switch from the given first acoustic-sensing optical fiber to the second acoustic-sensing optical fiber 202b (Block 1304), which is shown with dot-dot-dashed lines. In some embodiments, the processor 205 is part of a typical DAS system modified with the teachings of the present disclosure, and the processor performs the acoustic event detection and switching with no external computational assistance. In other embodiments, the processor 205 cooperates with external processing resources, such as a networked computing device, to perform the acoustic event detection and switching.

The processor 205 is configured to monitor the second acoustic-sensing optical fiber 202b and detect the acoustic event 203 on the second acoustic-sensing optical fiber. (Block 1306). In the illustrated embodiment, the processor 205 would switch the optical sensing signal back to the given first acoustic-sensing optical fiber 202a. (Blocks 1306 & 1303). The processor 205 is configured to operate the optical switch 207 to sequentially couple the OTDR 201 to the plurality of acoustic-sensing optical fibers 202a-202b. Helpfully, this embodiment of the DAS system 200 may permit return signals to be processed with less noise.

Of course, in other embodiments, the DAS system 200 comprises more than the illustrated two acoustic-sensing optical fibers 202a-202b. In these embodiments, the optical switch 207 is configured to continue to switch from the second acoustic-sensing optical fiber 202b to additional acoustic-sensing optical fibers 202a-202b to provide more data for determining the propagation direction $\theta_2$ of the acoustic wave from an acoustic event 203 in the acoustic wave transmitting medium 204. (Block 1307).

Advantageously, the DAS systems 100, 200 may provide directional wave propagation information, which can greatly increase the utility of DAS, as it can more effectively help to localize acoustic/seismic events. Moreover, the DAS systems 100, 200 may provide this functionality with a single OTDR unit.

Figure 6:
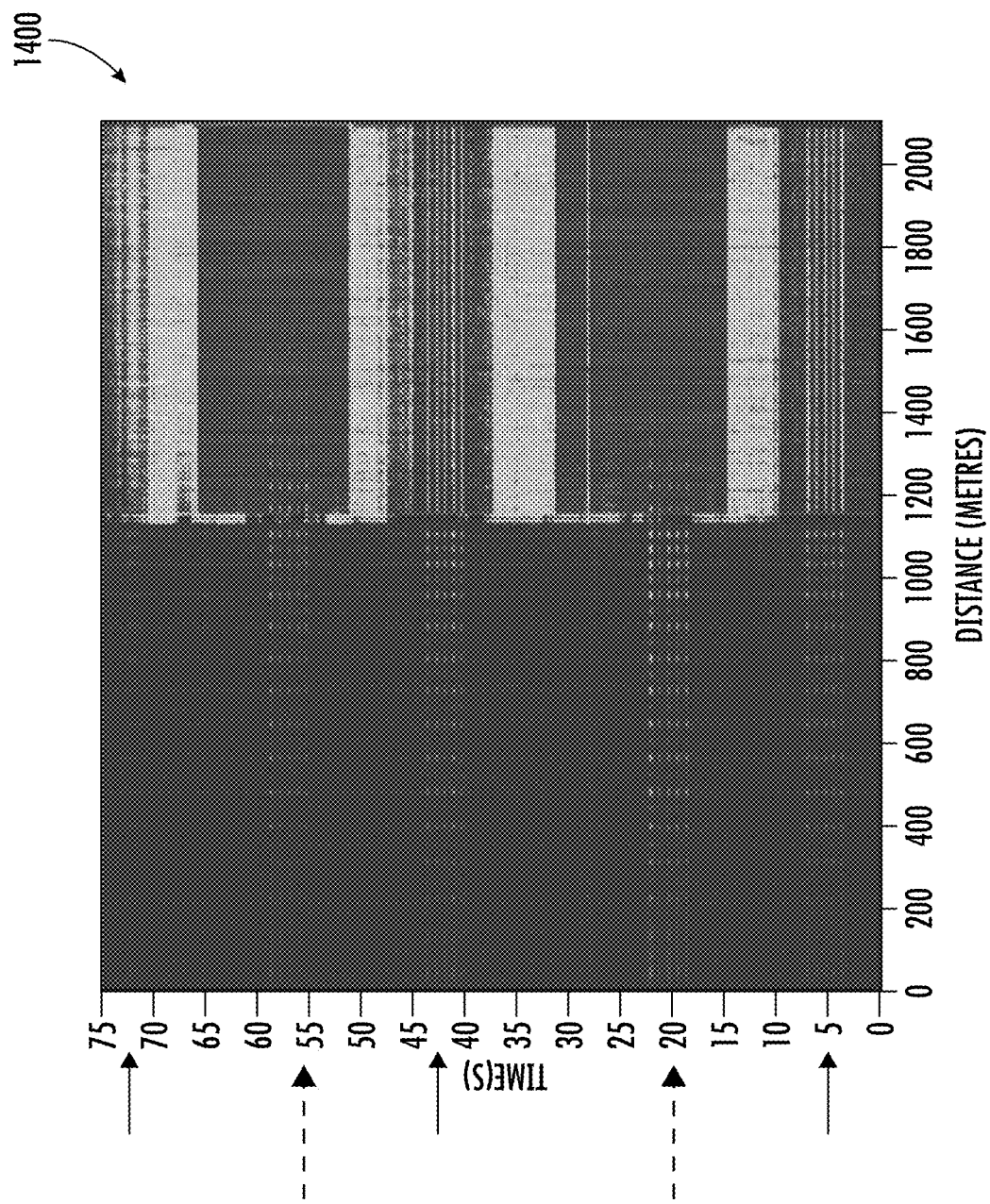
FIG. 6 is a diagram of return optical signals in the DAS system of FIG. 1.

Referring now additionally to FIG. 6, a diagram 1400 shows performance of the DAS systems 100, 200 as compared to typical DAS approaches. As shown, the DAS systems 100, 200 may provide for enhanced sensitivity. In particular, the signal responses visible on the left half of the diagram 1400 refer to a fiber spool connected to a typical DAS system (approximately 1 km of fiber). The right half of the diagram 1400 shows the fiber spools connected after the Y-branch which connects them both to the first 1 km spool on the left side in the DAS systems 100, 200. Thus, for the time segments with both spools connected (solid arrows), the overall sensitivity is increased for the right half of the diagram 1400 as evidenced by the entire spool length producing a return signal instead of the periodic returns obtained on the left hand side (from the first km of fiber). This effect is pronounced by observing the dashed arrow time segments which correspond to only one of the spools after the Y-branch being connected. The signal returning from the secondary spool in these cases is greatly reduced compared to both the first km spool and the fully branched time segments.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A distributed acoustic sensing (DAS) system comprising:
    an optical time domain reflectometer (OTDR);
    an optical switch;
    a plurality of acoustic-sensing optical fibers each selectively coupled to the OTDR via the optical switch, the plurality of acoustic-sensing optical fibers having known relative positions within an acoustic wave transmitting medium; and
    a processor cooperating with the OTDR to determine a propagation direction of an acoustic wave from an acoustic event in the acoustic wave transmitting medium based upon the known relative positions of the plurality of acoustic-sensing optical fibers;
    the processor configured to
        detect the acoustic wave from the acoustic event via a given acoustic-sensing optical fiber,
        cause the optical switch to switch from the given acoustic-sensing optical fiber to a different acoustic-sensing optical fiber before the acoustic wave from the acoustic event reaches the different acoustic-sensing optical fiber, and
        detect, subsequent to the detection via the given acoustic-sensing optical fiber, the acoustic wave from the acoustic event via the different acoustic-sensing optical fiber.

2. The DAS system of claim 1 wherein the processor is configured to operate the optical switch to sequentially couple the OTDR to the plurality of acoustic-sensing optical fibers.

3. The DAS system of claim 1 wherein the OTDR comprises an optical source configured to inject a sensing optical signal into a coupled acoustic-sensing optical fiber, and an optical detector configured to receive a return optical signal from the coupled acoustic-sensing optical fiber.

4. The DAS system of claim 1 wherein the plurality of acoustic-sensing optical fibers are arranged in a diverging pattern.

5. The DAS system of claim 1 wherein the acoustic wave transmitting medium comprises ground.

6. The DAS system of claim 1 wherein each of the plurality of acoustic-sensing optical fibers has a length greater than 10 km.

7. A distributed acoustic sensing (DAS) device comprising:

an optical time domain reflectometer (OTDR) and an associated optical switch to selectively couple each of a plurality of acoustic-sensing optical fibers having known relative positions within an acoustic wave transmitting medium to the OTDR; and a processor configured to determine a propagation direction of an acoustic wave from an acoustic event in the acoustic wave transmitting medium based upon the known relative positions of the plurality of acoustic-sensing optical fibers;

the processor configured to
- detect the acoustic wave from the acoustic event via a given acoustic-sensing optical fiber,
- selectively cause the optical switch to switch from the given acoustic-sensing optical fiber to a different acoustic-sensing optical fiber before the acoustic wave from the acoustic event reaches the different acoustic-sensing optical fiber, and
- detect, subsequent to the detection via the given acoustic-sensing optical fiber, the acoustic wave from the acoustic event via the different acoustic-sensing optical fiber.

8. The DAS device of claim 7 wherein the processor is configured to operate the optical switch to sequentially couple the OTDR to the plurality of acoustic-sensing optical fibers.

9. The DAS device of claim 7 wherein the OTDR comprises an optical source configured to inject a sensing optical signal into a coupled acoustic-sensing optical fiber, and an optical detector configured to receive a return optical signal from the coupled acoustic-sensing optical fiber.

10. A method of operating a distributed acoustic sensing (DAS) device using a plurality of acoustic-sensing optical fibers having known relative positions within an acoustic wave transmitting medium, the method comprising:

operating an optical time domain reflectometer (OTDR) in cooperation with a processor to determine a propagation direction of an acoustic wave from an acoustic event in the acoustic wave transmitting medium based upon the known relative positions of the plurality of acoustic-sensing optical fibers;

detecting the acoustic wave from the acoustic event via a given acoustic-sensing optical fiber, and causing an optical switch to switch from the given acoustic-sensing optical fiber to a different acoustic-sensing optical fiber before the acoustic wave from the acoustic event reaches the different acoustic-sensing optical fiber; and detecting, subsequent to the detecting via the given acoustic-sensing optical fiber, the acoustic wave from the acoustic event via the different acoustic-sensing optical fiber.

11. The method of claim 10 comprising operating the optical switch to sequentially couple the OTDR to the plurality of acoustic-sensing optical fibers.

* * * * *